US 7,784,860 B2

(12) United States Patent
Schacht et al.

(10) Patent No.: US 7,784,860 B2
(45) Date of Patent: Aug. 31, 2010

(54) CINCH/LOCK OF LEG TO ENSURE ENGAGEMENT (75) Inventors: David Michael Schacht, Canton, MI (US); Lei Cao, Farmington Hills, MI (US); Matthew J. McLaughlin, Chesterfield Township, MI (US); Catherine A. DeVoss, Plymouth, MI (US); Thomas J. Domlovil, Sterling Heights, MI (US); Jeffrey P. Carroll, West Bloomfield, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 0 days.

(21) Appl. No.: 11/996,106

(22) PCT Filed: Jul. 17, 2006

(86) PCT No.: PCT/CA2006/001138

§ 371 (c)(1),
(2), (4) Date: Sep. 2, 2008

(87) PCT Pub. No.: WO2007/009218

PCT Pub. Date: Jan. 25, 2007

(65) Prior Publication Data

US 2008/0315659 A1    Dec. 25, 2008

(51) Int. Cl.
*B60N 2/36* (2006.01)
(52) U.S. Cl. ............................ 297/15; 297/331; 297/334
(58) Field of Classification Search ................... 297/15, 297/331, 334
See application file for complete search history.

(56) References Cited

U.S. PATENT DOCUMENTS

| 5,498,051 | A | 3/1996 | Sponsler et al. |
| 6,099,072 | A | 8/2000 | Sturt et al. |
| 6,131,999 | A | 10/2000 | Piekny et al. |
| 6,155,626 | A | 12/2000 | Chabanne et al. |
| 6,375,246 | B1 | 4/2002 | Nicola et al. |
| 6,435,589 | B2 * | 8/2002 | Shimizu et al. ........... 297/15 X |
| 6,644,730 | B2 * | 11/2003 | Sugiura et al. ............... 297/15 |
| 6,935,682 | B2 * | 8/2005 | Park ............................ 297/15 |
| 7,213,861 | B2 * | 5/2007 | Yokoyama et al. ......... 297/15 X |
| 7,374,222 | B2 * | 5/2008 | McLaughlin et al. ...... 297/15 X |

(Continued)

FOREIGN PATENT DOCUMENTS

CA      2403372  A1    3/2003

(Continued)

*Primary Examiner*—Rodney B White
(74) *Attorney, Agent, or Firm*—Clark Hill PLC (57) ABSTRACT A seat assembly for a motor vehicle includes a seat cushion and an output shaft rotatably coupled to the seat cushion. An actuator is fixedly coupled to the seat cushion and operatively coupled to the output shaft for rotatably driving the output shaft. A front leg is operably connected to the actuator for movement between a support position supporting the seat cushion and a retracted position folded underneath the seat cushion. A front latch is mounted on the front leg and is positioned to selectively engage a striker bar along a motor vehicle floor for maintaining the front leg in the support position. A link assembly extends between the output shaft and the front latch for selectively unlocking the front latch as the output shaft is rotatably driven by the actuator to drive the front leg between the retracted position and the support position.

13 Claims, 6 Drawing Sheets

U.S. PATENT DOCUMENTS

| | | | |
|---|---|---|---|
| 7,377,582 B2 * | 5/2008 | Fukada et al. | 297/15 |
| 7,484,785 B2 * | 2/2009 | Weber | 297/15 X |
| 7,497,511 B2 * | 3/2009 | Park et al. | 297/15 |
| 7,517,022 B2 * | 4/2009 | Habedank et al. | 297/15 X |
| 7,537,260 B2 * | 5/2009 | Epaud | 297/15 X |
| 7,568,764 B2 * | 8/2009 | Harper et al. | 297/15 X |
| 2001/0052718 A1 * | 12/2001 | Sugiura et al. | 297/15 |
| 2001/0054835 A1 | 12/2001 | Feng | |
| 2002/0067056 A1 | 6/2002 | Garrido et al. | |
| 2004/0169391 A1 | 9/2004 | Imajo et al. | |
| 2004/0169404 A1 | 9/2004 | Imajo et al. | |
| 2005/0057082 A1 | 3/2005 | Hatta et al. | |
| 2005/0082883 A1 * | 4/2005 | Park | 297/15 |
| 2007/0046074 A1 * | 3/2007 | Satta et al. | 297/15 |

FOREIGN PATENT DOCUMENTS

| | | |
|---|---|---|
| CA | 2442501 A1 | 3/2004 |
| CA | 2498857 A1 | 4/2004 |

* cited by examiner

CINCH/LOCK OF LEG TO ENSURE ENGAGEMENT

FIELD OF THE INVENTION

The invention relates to a seat assembly for a motor vehicle. More particularly, the invention relates to a seat assembly including a front leg that is selectively retracted underneath a seat cushion.

DESCRIPTION OF RELATED ART

Motor vehicles commonly include one or more rows of rear seat assemblies each including a seat cushion and a seat back. The seat back is pivotally secured to the seat cushion by a recliner mechanism for allowing selective pivotal adjustment of the seat back relative to the seat cushion between a plurality of seating positions. Typically, the seat back is also movable to a generally horizontal, folded position to present a load floor surface on a back portion of the seat back.

In addition, it is well-known to those skilled in the seating art to provide a stowable seat assembly that is manually movable between the plurality of seating positions and a stowed position nested within a recess formed in a floor of the motor vehicle. It remains desirable to provide a system for automatically moving the seat assembly between the plurality of seating positions and the stowed position.

SUMMARY OF THE INVENTION

According to one aspect of the invention, a seat assembly for a motor vehicle includes a seat cushion and an output shaft rotatably coupled to the seat cushion. An actuator is fixedly coupled to the seat cushion and operatively connected to the output shaft for rotatably driving the output shaft. A front leg is operatively connected to the actuator for movement between a support position supporting the seat cushion and a retracted position folded underneath the seat cushion. A front latch is mounted to the front leg and positioned to selectively engage a striker bar along a motor vehicle floor to maintain the front leg in the support position. A link assembly extends between the output shaft and the front latch for selectively unlocking the front latch as the output shaft is rotatably driven by the actuator to drive the front leg between the retracted position and the support position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
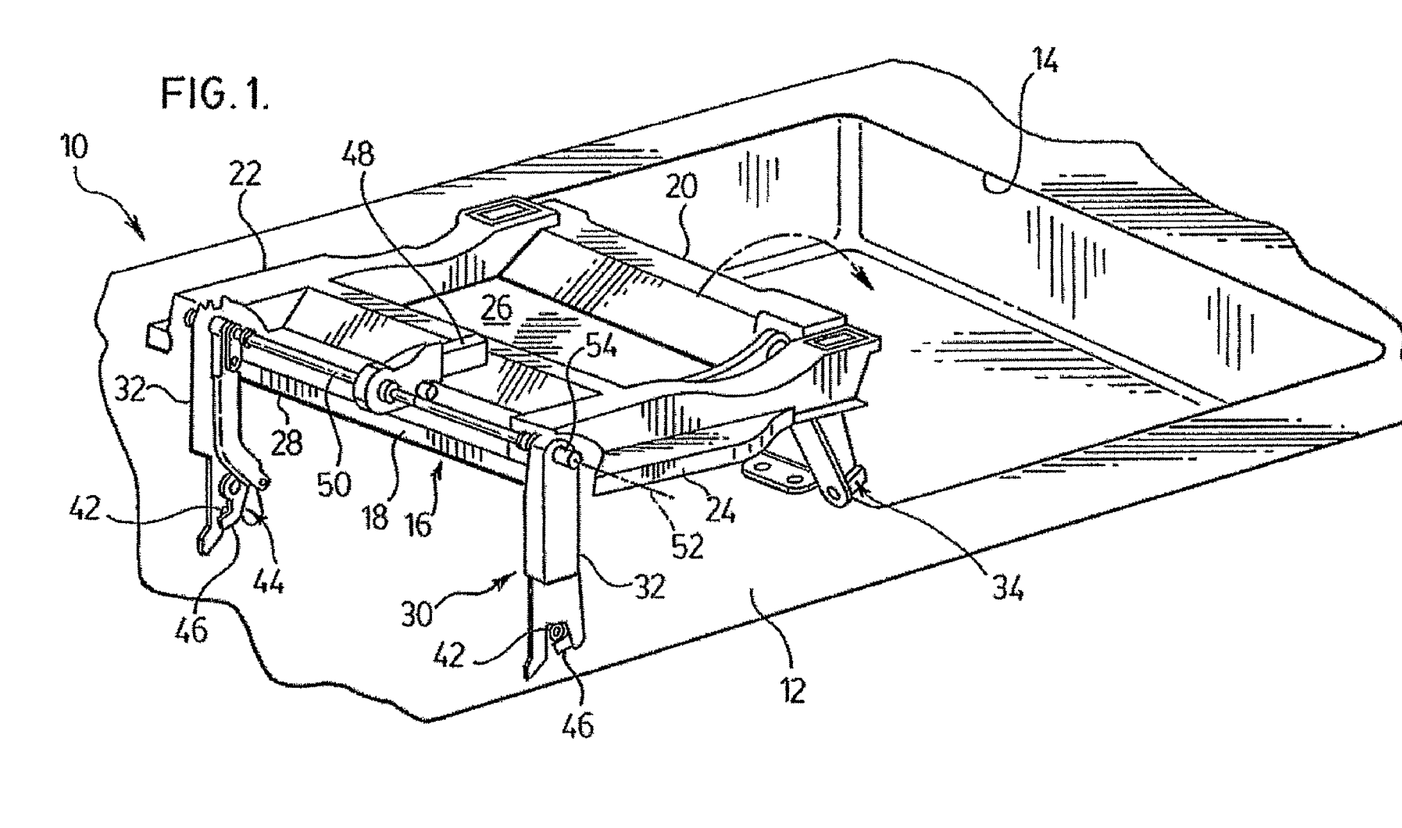
FIG. 1 is a perspective view of a seat assembly according to the invention disposed above a motor vehicle floor.

Referring to FIG. 1, a seat assembly 10, is provided for supporting an occupant above a motor vehicle floor 12 having a recess 14 disposed therein. The seat assembly 10 includes a seat cushion pan, generally indicated at 16, extending longitudinally between a front end 18 and an opposing rear end 20, and laterally between a pair of spaced apart sides 22, 24. The seat cushion pan 16 includes a support surface 26 and a generally planar bottom surface 28.

The seat assembly 10 also includes a riser mechanism 30 disposed between the seat cushion pan 16 and the motor vehicle floor 12. The riser mechanism 30 includes a pair of front legs 32 coupled to the front end 18 of the seat cushion pan 16, and a pair of rear leg assemblies, generally indicated at 34, coupled to the rear end 20 of the seat cushion pan 16.

The rear leg assemblies are more particularly described in PCT Publication no. WO 04/076228.

Figure 2:
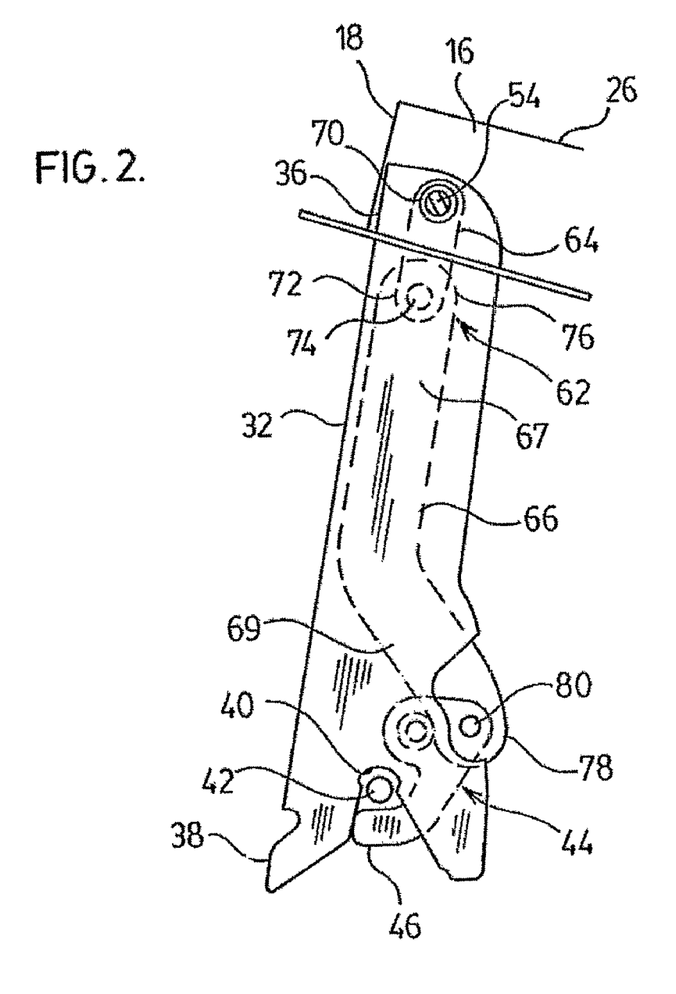
FIG. 2 is a fragmentary, side view of the seat assembly including a front leg in a support position.
Figure 3:
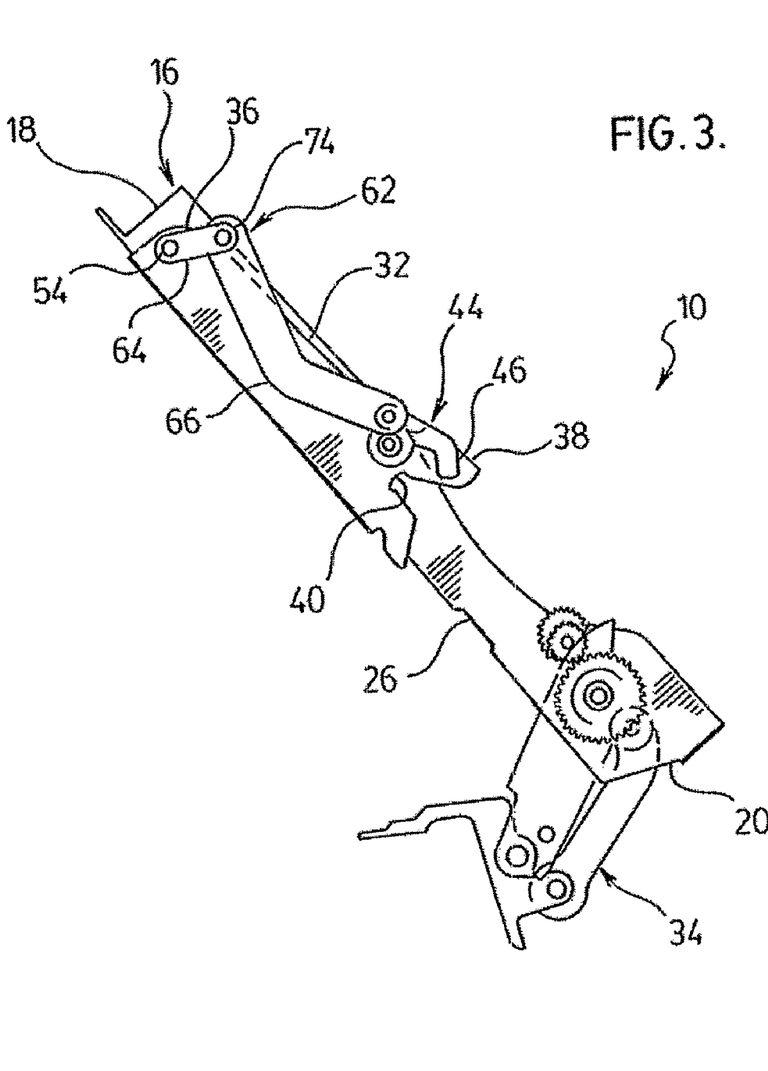
FIG. 3 is a fragmentary, side view of the seat assembly including the front leg in a retracted position.

Referring to FIG. 2, each of the pair of front legs 32 mirror images of each other. Accordingly, only one side is described in detail. Each front leg 32 extends between a cushion end 36 and a distal end 38. The front leg 32 includes a fishmouth or opening 40 at the distal end 38 for selectively receiving a striker bar 42, which is fixedly secured along the motor vehicle floor 12. The front leg 32 is movable between a support position, shown in FIGS. 1 and 2, and a retracted position, shown in FIG. 3. In the support position, the fishmouth 40 receives the striker bar 42 along the motor vehicle floor 12. In the retracted position, the front leg 32 is tucked underneath the seat cushion pan 16 to create a tight packaging unit for stowing into the recess 14 of the motor vehicle floor 12.

A front latch, generally indicated at 44, includes a hook portion 46 and pivots to cooperate with the fishmouth 40 for selectively engaging the striker bar 42 along the motor vehicle floor 12. More specifically, the front latch 44 is movable between a locked position, shown in FIGS. 4 and 5, and an unlocked position, shown in FIGS. 6 and 7. In the locked position, the hook portion 46 retains the striker bar 42 within the fishmouth 40 of the front leg 32 to secure the front leg 32 in its support position along the motor vehicle floor 12. When the front latch 44 is in the unlocked position, the hook portion 46 is pivoted relative to the fishmouth 40 to release the latch 44 from the striker bar 42 and allow the front leg 32 to move to the retracted position.

Referring back to FIG. 1, the seat assembly 10 further includes an actuator or motor 48 fixedly secured to the seat cushion pan 16 adjacent the front end 18 thereof. An output shaft 50 extends axially outwardly from the motor 48 and defines a rotation axis 52. The output shaft 50 is rotatably mounted to near the front end 18 of the seat cushion pan 16. The output shaft 50 is rotatably driven about the rotation axis 52 by the motor 48 upon activation thereof. The motor 48 is reversible. Therefore, the output shaft 50 is rotatably driven in either the clockwise direction or the counterclockwise direction depending on the direction of current flow to the motor 48.

Figure 4:
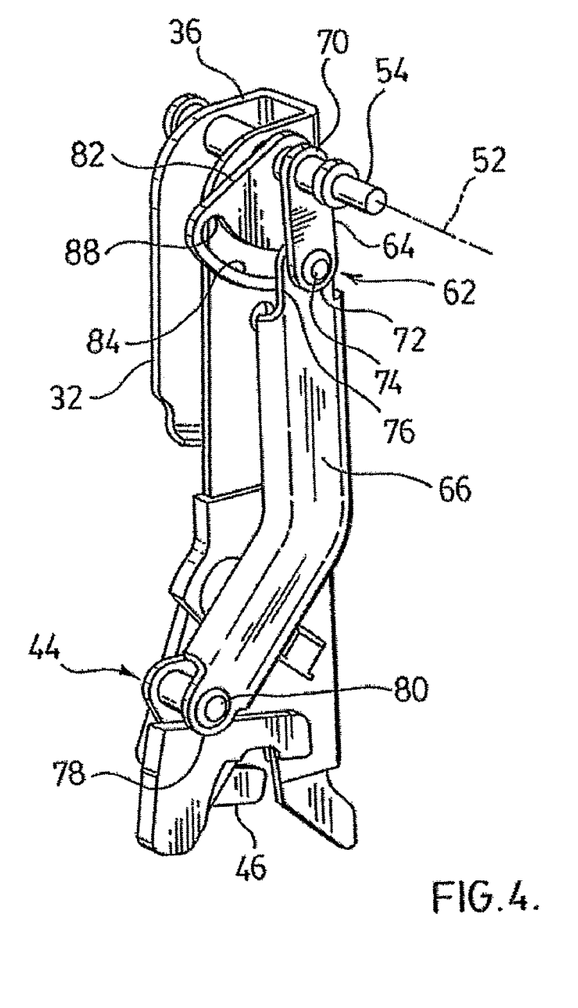
FIG. 4 is a perspective view of a link assembly disposed between an output shaft and a front latch wherein the front latch is in a locked position.
Figure 5:
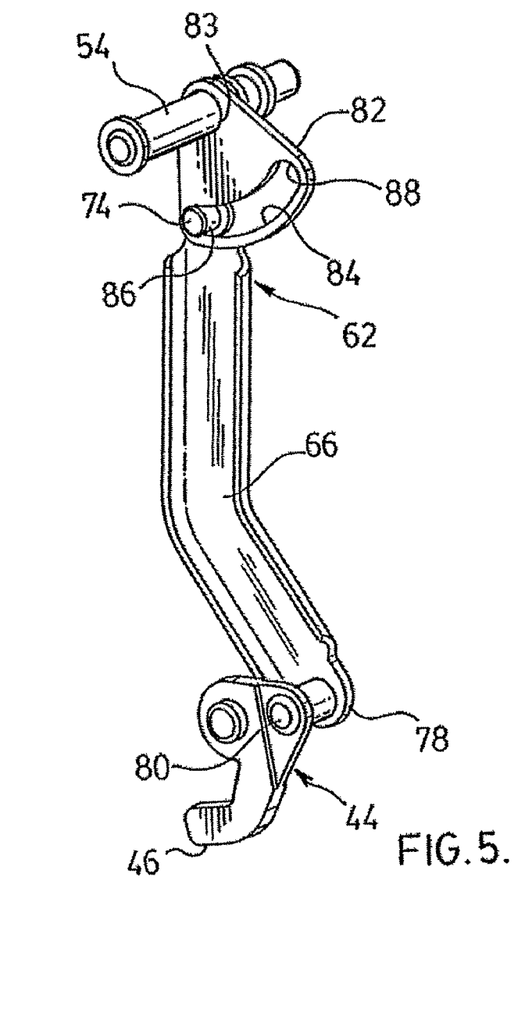
FIG. 5 is an opposing, perspective view of the link assembly in FIG. 4 with the front latch in the locked position.
Figure 6:
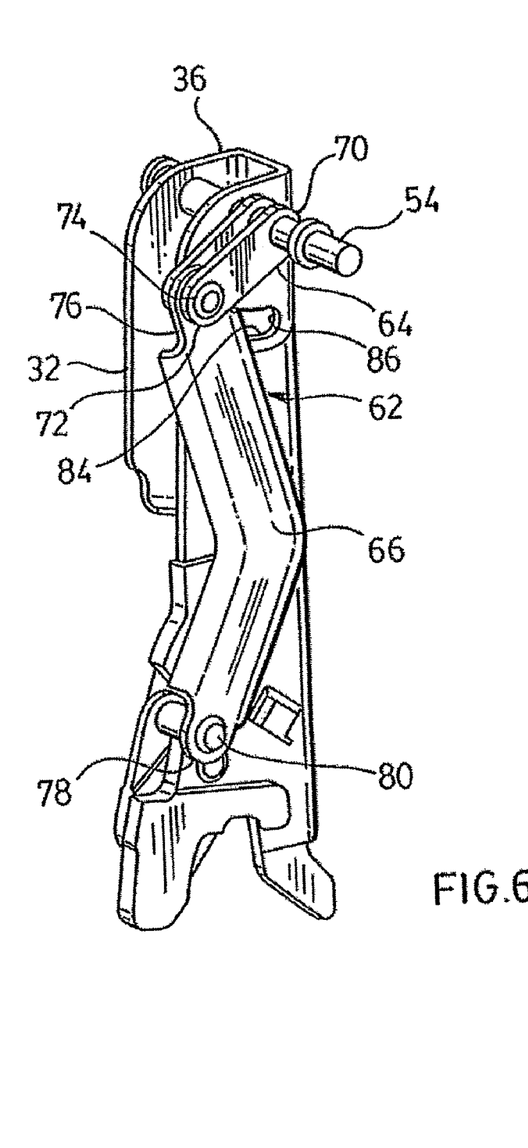
FIG. 6 is a perspective view of the link assembly with the front latch in the unlocked position.
Figure 7:
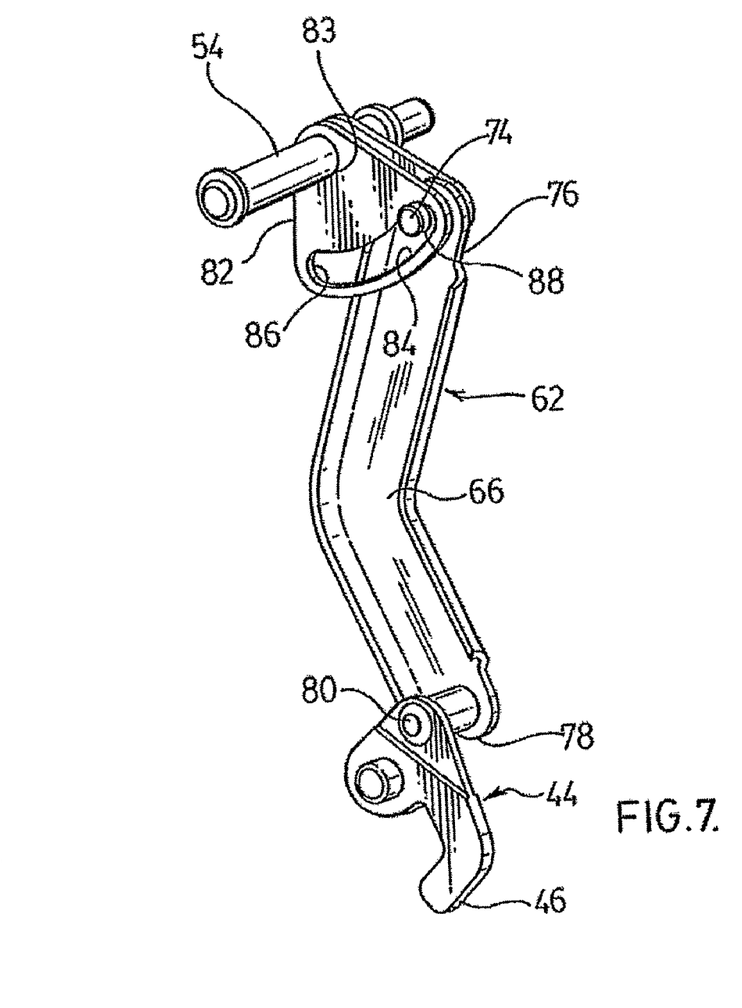
FIG. 7 is an opposing, perspective view of the link assembly in FIG. 6 with the front latch in the unlocked position.

A shaft 54 is fixedly secured to each end of the output shaft 50 for rotation therewith about the rotation axis 52. The cushion end 36 of the front leg 32 is rotatably mounted on the shaft 54, as shown in FIGS. 4 and 6. Therefore, when the front latch 44 is in the unlocked position, front leg 32 is capable of pivotally moving between the support and retracted positions.

A spring 56, shown in FIG. 1, is wound around the shaft 54 and includes one arm 58 engaging the front leg 32 and another arm 60 secured to the seat cushion pan 16. Spring 56 biases the front leg 32 towards the support position.

Referring once again to FIG. 2, a compound link assembly 62 extends between the shaft 54 and the front latch 44. The compound link assembly 62 includes a first link 64 and a second link 66. The first link 64 includes an upper end 70 mounted on the shaft 54 and a lower end 72 having a pivot pin 74. The second link 66 includes an upper end 76 pivotally mounted about the pivot pin 74 and a lower end 78 pivotal about a lower pin 80. The second link 66 has a first segment 67 and a second segment 69 extending out at an obtuse angle therefrom. The front latch 44 also pivots about the lower pin 80. Therefore, the front latch 44 is operably coupled to the shaft 54 via the compound link assembly 62.

Referring to FIGS. 4 through 7, the compound link assembly 62 has a lost motion connection to the front leg 32. The lost motion connection comprises a sector plate 82 includes an aperture 83 for rotatably receiving the shaft 54 therethrough. The sector plate 82 is disposed about the shaft 54 between the front leg 32 and the first link 64 and fixedly secured relative to the front leg 32 to rotate therewith and operably connected to the first link 64. Preferably, the sector plate 82 is generally wedge-shaped. It is, however, appreciated that the particular shape of the sector plate 82 may vary.

The sector plate 82 also includes an arcuate slot 84 remote from the aperture 83. The arcuate slot 84 extends between a first end 86 and a second end 88, and receives the pivot pin 74 therethrough. The pivot pin 74 travels between the first 86 and second 88 ends of the arcuate slot 84 as the motor 48 rotatably drives the shaft 54 about the shaft axis 52 in order to move the front latch 44 between the locked and unlocked positions to provide a lost motion connection between the link assembly 62 and the shaft 54.

Figure 8:
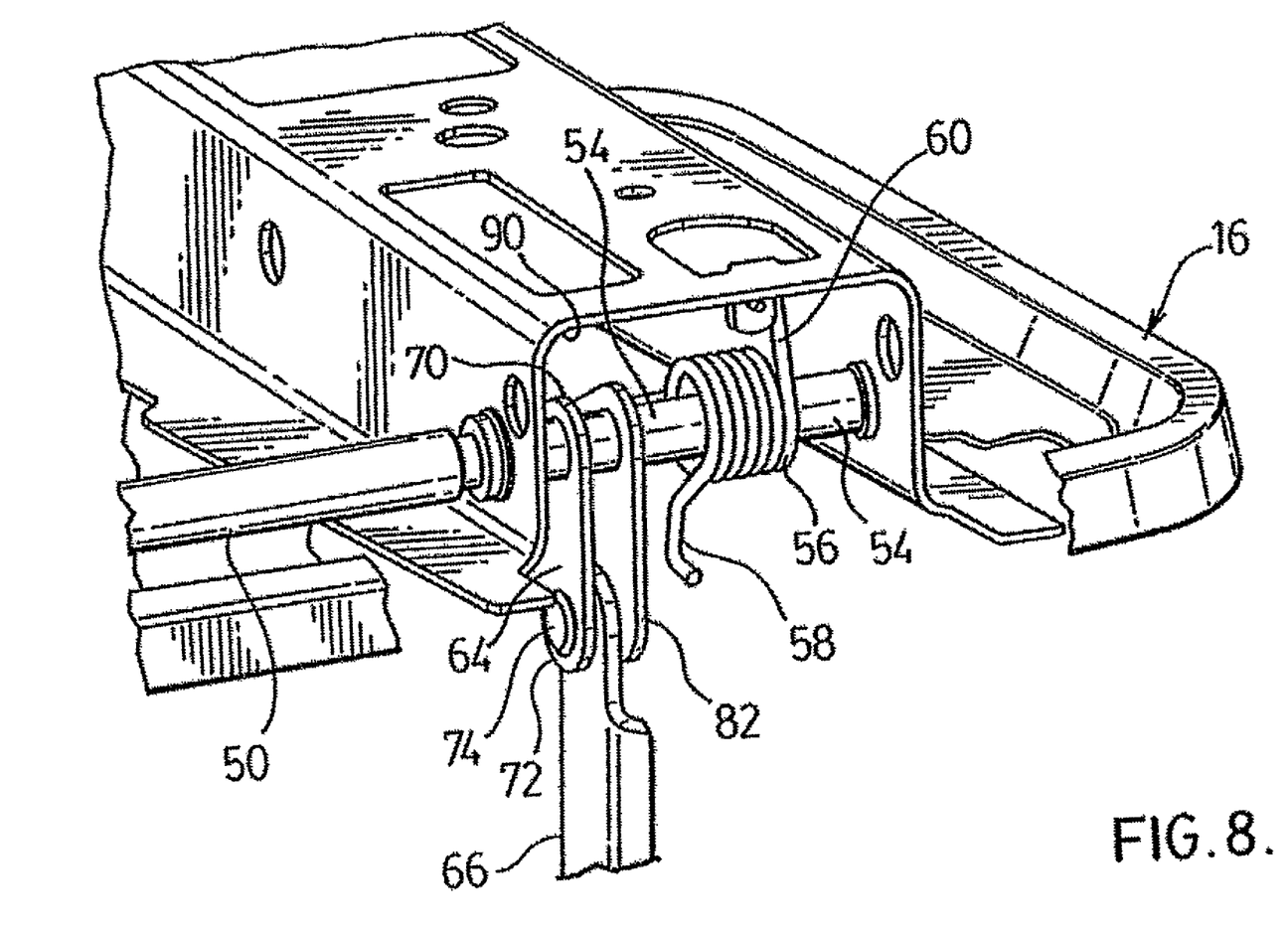
FIG. 8 is a fragmentary, perspective view of the seat assembly including a cavity for receiving the retracted front leg.

In operation, starting with the front leg 32 in the support position and the front latch 44 in the locked position, as shown in FIG. 4, the motor 48 is activated to rotate the output shaft 50 in the clockwise direction. The shaft 54 rotates with the output shaft 50 to rotate the first link 64, thereby causing the pivot pin 74 to travel from the first end 86 of the arcuate slot 84 to the second end 88 thereof. The second link 66 moves with the pivot pin 74. The movement of the second link 66 pivots the front latch 44 from the locked position to the unlocked position, shown in FIG. 6. As the motor 48 continues to drive the output shaft 50, and with it the shaft 54, in the clockwise direction, the first link 64 urges the sector plate 82 into rotation to drive the front leg 32 away from the motor vehicle floor 12 and into the retracted position within a side cavity 90, shown in FIG. 8, of the seat cushion pan 16. One of the side cavities 90 is disposed along each side 22, 24 of the seat cushion pan 16 outboard of the generally planar bottom surface 28 thereof for receiving one of the retracted front legs 32. The seat assembly 10 then pivots about the rear leg assembly 34 until it reaches a stowed position within the recess 14 of the motor vehicle floor 12. When the seat assembly 10 is stowed in the recess 14 of the motor vehicle floor 12, the generally planar bottom surface 28 of the seat cushion pan 16 presents itself as a load floor.

To move the front leg 32 back to the support position, the motor 48 is activated to rotate the output shaft 50, and with it the shaft 54, in the counterclockwise direction, as viewed in FIG. 6. As a result, front leg 32 moves from retracted position and towards the support position under the bias of spring 56. Once the front leg 32 bottoms out so that the striker bar 42 is received within the fishmouth 40, the front latch 44 is allowed to move into the locked position. In this regard, the motor 48 continues to drive the output shaft 50, and with it the shaft 54, to rotate the first link 64. The rotation of the first link 64 causes the pivot pin 74 to travel from the second end 88 of the arcuate slot 84 to the first end 86 thereof. When the pivot pin 74 reaches the first end 86, the front latch 44 is in the locked position with the hook portion 46 retaining the striker bar 42 within the fishmouth 40.

In the preferred embodiment, driving movement of the seat cushion pan 16 as disclosed in PCT publication no. WO 04/076228, is coordinated with the driving of actuator 48.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A seat assembly for a motor vehicle having:
   a seat cushion pan;
   a front leg pivotally mounted to said seat cushion pan for movement between a support position supporting said seat cushion pan and a retracted position folded underneath said seat cushion pan;
   a spring biasing the front leg towards the support position;
   a front latch pivotally mounted on said front leg for movement between a latched position and unlatched position;
   a compound link assembly rotatably mounted to said seat cushion pan, said compound link assembly directly coupled to said front latch and operatively coupled to said front leg thereby providing a lost motion connection therebetween; and
   an actuator drivingly engaging said compound link assembly, whereby said lost motion connection provides that rotation of the actuator in a first sense initially moves the front latch from the latched position to the unlatched position and then rotates the front leg to the retracted position and rotation of the actuator in a second sense opposite said first sense, allows the front leg to move from the retracted position to the support position and then moves the front latch from the unlatched position to the latched position.

2. A seat assembly according to claim 1, wherein said compound link assembly comprises a first link operatively connected to said actuator and a second link pivotally extending between said front latch and said first link.

3. A seat assembly according to claim 2, wherein said lost motion connection comprises an actuate slot on said front leg and a pin traveling in said slot, said pin pivotally connecting said first link and said second link.

4. A seat assembly according to claim 3, wherein said front leg and said compound link are mounted on a common shaft, said shaft rotatably mounted across a front end of said seat cushion pan and said actuator rotates said shaft in said first and second senses.

5. A seat assembly according to claim 1, further comprising:
   a second front leg pivotally mounted to said seat cushion pan for movement between a support position supporting said seat cushion pan and a retracted position folded underneath said seat cushion pan;
   a second spring biasing the second front leg towards the support position;
   a second front latch pivotally mounted on said second front leg for movement between a latched position and unlatched position;

a second compound link assembly rotatably mounted to said seat cushion pan, said second compound link assembly directly coupled to said second front latch and coupled to said second front leg in a lost motion connection;

said actuator commonly drivingly said second compound link assembly.

6. A seat assembly according to claim 5, wherein said second compound link assembly comprises a third link operatively connected to said actuator and a fourth link pivotally extending between said second front latch and said third link.

7. A seat assembly according to claim 6, wherein said lost motion connection comprises a second actuate slot on said second front leg and a second pin traveling in said second slot, said second pin pivotally connecting said third link and said fourth link.

8. A seat assembly according to claim 7, wherein said second front leg and said second compound link are mounted on said shaft.

9. A seat assembly according to claim 8, wherein said second and fourth links each has a first segment and a second segment extending at an obtuse angle therefrom.

10. A seat assembly according to claim 9, wherein said first arcuate slot is on a sector plate mounted in a fixed relation to said first front leg and said second arcuate slot is on a second sector plate mounted in fixed relation to said second front leg.

11. A seat assembly according to claim 10, wherein each of said first and second front legs has a fishmouth and said first and second latches respectively cooperate with the fishmouth to latch and unlatch to a vehicle striker bar.

12. A seat assembly for a motor vehicle, said seat assembly comprising:

a seat cushion pan;

a front leg pivotally mounted to said seat cushion pan for movement between a support position supporting said seat cushion pan and a retracted position folded underneath said seat cushion pan, said front leg including an arcuate slot;

a spring biasing said front leg towards said support position;

a front latch pivotally mounted on said front leg for movement between a latched position and unlatched position;

an actuator;

a first link rotatably mounted to said seat cushion pan and operatively connected to said actuator; and a second link pivotally coupled directly to said front latch and pivotally coupled to said first link by a pin, said pin traveling in said arcuate slot;

said actuator drivingly engaging said first link, whereby rotation of said actuator in a first sense initially moves said front latch from said latched position to said unlatched position and then rotates said front leg from said support position to said retracted position, and rotation of said actuator in a second sense, opposite said first sense, rotates said front leg from said retracted position to said support position and then moves said front latch from said unlatched position to said latched position.

13. A seat assembly for a motor vehicle, said seat assembly comprising:

a seat cushion pan;

first and second front legs pivotally mounted to said seat cushion pan for movement between a support position supporting said seat cushion pan and a retracted position folded underneath said seat cushion pan, said first front leg including a first arcuate slot and said second front leg including a second arcuate slot;

first and second springs biasing said first and second front legs towards said support position;

first and second front latches pivotally mounted on said first and second front legs for movement between a latched position and unlatched position;

an actuator;

a first link rotatably mounted to said seat cushion pan and operatively connected to said actuator;

a second link pivotally coupled directly to said first front latch and pivotally coupled to said first link by a first pin, said first pin traveling in said first arcuate slot;

a third link rotatably mounted to said seat cushion pan and operatively connected to said actuator; and a fourth link pivotally coupled directly to said second front latch and pivotally coupled to said third link by a second pin, said second pin traveling in said second arcuate slot;

said actuator drivingly engaging said first and second links, whereby rotation of said actuator in a first sense initially moves said first and second front latches from said latched position to said unlatched position and then rotates said first and second front legs from said support position to said retracted position, and rotation of said actuator in a second sense, opposite said first sense, rotates said first and second front legs from said retracted position to said support position and then moves said first and second front latches from said unlatched position to said latched position.

* * * * *